US012749074B2

(12) United States Patent
Cui et al.

(10) Patent No.: US 12,749,074 B2
(45) Date of Patent: Sep. 29, 2026

(54) AUTHENTICATION METHOD AND APPARATUS OF BIOMETRIC PAYMENT DEVICE, COMPUTER DEVICE, AND STORAGE MEDIUM

(71) Applicant: TENCENT TECHNOLOGY (SHENZHEN) COMPANY LIMITED, Shenzhen (CN)

(72) Inventors: Qi Cui, Shenzhen (CN); Zhijun Geng, Shenzhen (CN); Runzeng Guo, Shenzhen (CN); Shaoming Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/245,325

(22) Filed: Jun. 21, 2025

(65) Prior Publication Data

US 2025/0322391 A1 Oct. 16, 2025

Related U.S. Application Data

(60) Division of application No. 17/726,402, filed on Apr. 21, 2022, now Pat. No. 12,361,412, which is a (Continued)

(30) Foreign Application Priority Data

Mar. 23, 2020 (CN) ......................... 202010208265.6

(51) Int. Cl.
*G06Q 20/38* (2012.01)
*G06Q 20/40* (2012.01)
(Continued)

(52) U.S. Cl.
CPC ... *G06Q 20/3829* (2013.01); *G06Q 20/40145* (2013.01); *H04L 9/0822* (2013.01); (Continued)

(58) Field of Classification Search
CPC .......... G06Q 20/3829; G06Q 20/40415; H04L 9/0822; H04L 9/3231; H04L 9/3247
(Continued)

(56) References Cited

U.S. PATENT DOCUMENTS

2017/0148029 A1* 5/2017 Hu ..................... G06Q 20/3227
2018/0012213 A1* 1/2018 Adelgren ................ G06F 21/45
(Continued)

FOREIGN PATENT DOCUMENTS

WO WO-2017197974 A1 * 11/2017 ........... H04L 9/3231

*Primary Examiner* — Courtney P Jones
(74) *Attorney, Agent, or Firm* — Anova Law Group, PLLC

(57) ABSTRACT

An authentication method of a biometric payment device includes: acquiring a key of the biometric payment device, the key being a key recognized by a payment authentication server and acquired through communication between a manufacturer device and the payment authentication server during a production phase; generating a signature according to the key and device information; transmitting an authentication request to the payment authentication server based on the device information and the signature, the authentication request being used for instructing the payment authentication server to verify the signature according to the device information, and generate an authentication result of the biometric payment device according to a verification result; and receiving the authentication result returned by the payment authentication server, the authentication result causing the payment authentication server to implement a biometric payment based on biometric data transmitted by the authenticated biometric payment device.

13 Claims, 8 Drawing Sheets

Related U.S. Application Data continuation of application No. PCT/CN2021/076438, filed on Feb. 10, 2021.

(51) Int. Cl.
*H04L 9/08* (2006.01)
*H04L 9/32* (2006.01)

(52) U.S. Cl.
CPC .......... *H04L 9/3231* (2013.01); *H04L 9/3247* (2013.01); *H04L 2209/56* (2013.01)

(58) Field of Classification Search
USPC ........................................................... 705/71
See application file for complete search history.

(56) References Cited

U.S. PATENT DOCUMENTS

2019/0036917 A1* 1/2019 Sun ....................... H04L 9/0825
2020/0021448 A1* 1/2020 Chumbley .......... H04L 63/0884

* cited by examiner

AUTHENTICATION METHOD AND APPARATUS OF BIOMETRIC PAYMENT DEVICE, COMPUTER DEVICE, AND STORAGE MEDIUM

CROSS-REFERENCES TO RELATED APPLICATIONS

This application is a divisional application to U.S. application Ser. No. 17/726,402 filed on Apr. 21, 2022; U.S. application Ser. No. 17/726,402 is a continuation application of PCT Patent Application No. PCT/CN2021/076438, entitled "METHOD AND APPARATUS FOR AUTHENTICATING BIOMETRIC PAYMENT DEVICE, COMPUTER DEVICE AND STORAGE MEDIUM" and filed on Feb. 10, 2021, which claims priority to Chinese Patent Application No. 202010208265.6, entitled "AUTHENTICATION METHOD AND APPARATUS OF BIOMETRIC PAYMENT DEVICE, COMPUTER DEVICE, AND STORAGE MEDIUM" filed with the China National Intellectual Property Administration on Mar. 23, 2020, the entire contents of all of which are incorporated herein by reference.

FIELD OF THE TECHNOLOGY

The present disclosure relates to the field of Internet communication technologies, and in particular, to an authentication method and apparatus of a biometric payment device, a computer device, and a storage medium.

BACKGROUND OF THE DISCLOSURE

With the development of biometric payment technologies, biometric payment is widely applied to a variety of business scenarios. Taking face-swiping payment in a biometric payment scenario as an example, a specific application scenario is that: after receiving the amount of payment, a cashier terminal calls a camera to acquire a face image of a user and transmits the face image to a payment system. After the payment system passes the recognition of the face image of the user, a payment code is returned to the cashier terminal. The cashier terminal initiates a payment request to the payment system according to the payment code, to complete the payment.

The face-swiping payment does not require the user to operate a payment code on the terminal, and the payment code is generated by the payment system based on the face image acquired by the cashier terminal. Therefore, it is necessary to authenticate the connected cashier device to ensure the fund account security of the user. The authentication of a conventional face payment device is a simple mapping relationship authentication, where a signature string and a device number of the device are stored in system properties and a device authentication interface is invoked for device authentication. A payment authentication server is configured to verify the device number, so as to implement two-way authentication between the device side and the payment system, mutually trust identities, and establish a two-way secure link.

In an actual application, it is relatively simple to use the mapping relationship between a signature and a device code for authentication. Another device may pretend to be the device for device authentication by migrating the device code and the device signature, thereby affecting the security performance of the biometric payment.

SUMMARY

According to embodiments of the present disclosure, an authentication method and apparatus of a biometric payment device, a computer device, and a storage medium are provided.

One aspect of the present disclosure provides an authentication method of a biometric payment device. The method includes: acquiring a key of the biometric payment device, the key being a key recognized by a payment authentication server and acquired through communication between a manufacturer device and the payment authentication server during a production phase; generating a signature according to the key and device information; transmitting an authentication request to the payment authentication server based on the device information and the signature, the authentication request being used for instructing the payment authentication server to verify the signature according to the device information, and generate an authentication result of the biometric payment device according to a verification result; and receiving the authentication result returned by the payment authentication server, the authentication result causing the payment authentication server to implement a biometric payment based on biometric data transmitted by the authenticated biometric payment device.

Another aspect of the present disclosure provides authentication method of a biometric payment device. The method includes: receiving an authentication request transmitted by the biometric payment device based on a signature and device information, the signature being generated by the biometric payment device according to a key and the device information, and the key being a key recognized by a payment authentication server and acquired through communication between a manufacturer device and the payment authentication server during a production phase; verifying the signature according to the device information; generating an authentication result of the biometric payment device according to a verification result; and returning the authentication result to the biometric payment device, to implement a biometric payment based on biometric data transmitted by the authenticated biometric payment device.

Another aspect of the present disclosure provides a biometric payment device, including a memory and a processor, the memory storing a computer program, and the processor, when executing the computer program, implementing: acquiring a key of the biometric payment device, the key being a key recognized by a payment authentication server and acquired through communication between a manufacturer device and the payment authentication server during a production phase; generating a signature according to the key and device information; transmitting an authentication request to the payment authentication server based on the device information and the signature, the authentication request being used for instructing the payment authentication server to verify the signature according to the device information, and generate an authentication result of the biometric payment device according to a verification result; and receiving the authentication result returned by the payment authentication server, the authentication result causing the payment authentication server to implement a biometric payment based on biometric data transmitted by the authenticated biometric payment device.

Another aspect of the present disclosure provides a non-transitory computer-readable storage medium is provided, storing a computer program, the computer program, when executed by a processor, implementing the following steps: acquiring a key of the device, the key being a key recognized by a payment authentication server and acquired through communication between a manufacturer device and the payment authentication server during a production phase; generating a signature according to the key and device information; transmitting an authentication request to the payment authentication server based on the signature, the authentication request being used for carrying a device ID, and instructing the payment authentication server to verify the signature according to the device ID, and generate an authentication result of the biometric payment device according to a verification result; and receiving the authentication result returned by the payment authentication server, the authentication result causing the payment authentication server to implement a biometric payment based on biometric data transmitted by the authenticated biometric payment device.

BRIEF DESCRIPTION OF THE DRAWINGS

To describe the technical solutions in the embodiments of the present disclosure or in the existing technology more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are only used for explaining the present disclosure, and are not used for limiting the present disclosure.

Figure 1:
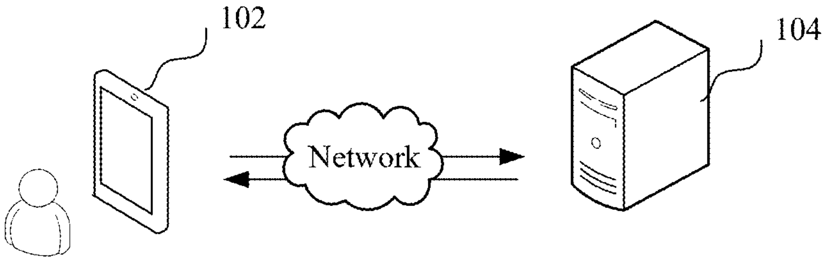
FIG. 1 is a diagram of an application environment of an authentication method of a biometric payment device according to an embodiment.

An authentication method of a face payment device provided in the present disclosure may be applied to an application environment shown in FIG. 1. A biometric payment device 102 communicates with a payment authentication server 104 via a network, and acquires a key of the device, the key being a key recognized by the payment authentication server and acquired through communication between a manufacturer device and the payment authentication server during a production phase; generates a signature according to the key and device information; transmits an authentication request to the payment authentication server based on the signature, the authentication request being used for carrying a device ID, and instructing the payment authentication server to verify the signature according to the device ID, and generate an authentication result of the biometric payment device according to a verification result; and receives the authentication result returned by the payment authentication server, the authentication result causing the payment authentication server to implement a biometric payment based on biometric data transmitted by the authenticated biometric payment device. The biometric payment device 102 may be a cashier terminal with a human body biometric data acquisition device, including a hardware device such as a fingerprint acquisition device, an image acquisition device, or the like. The payment authentication server 104 may be implemented by using an independent server or a server cluster including a plurality of servers.

Figure 2:
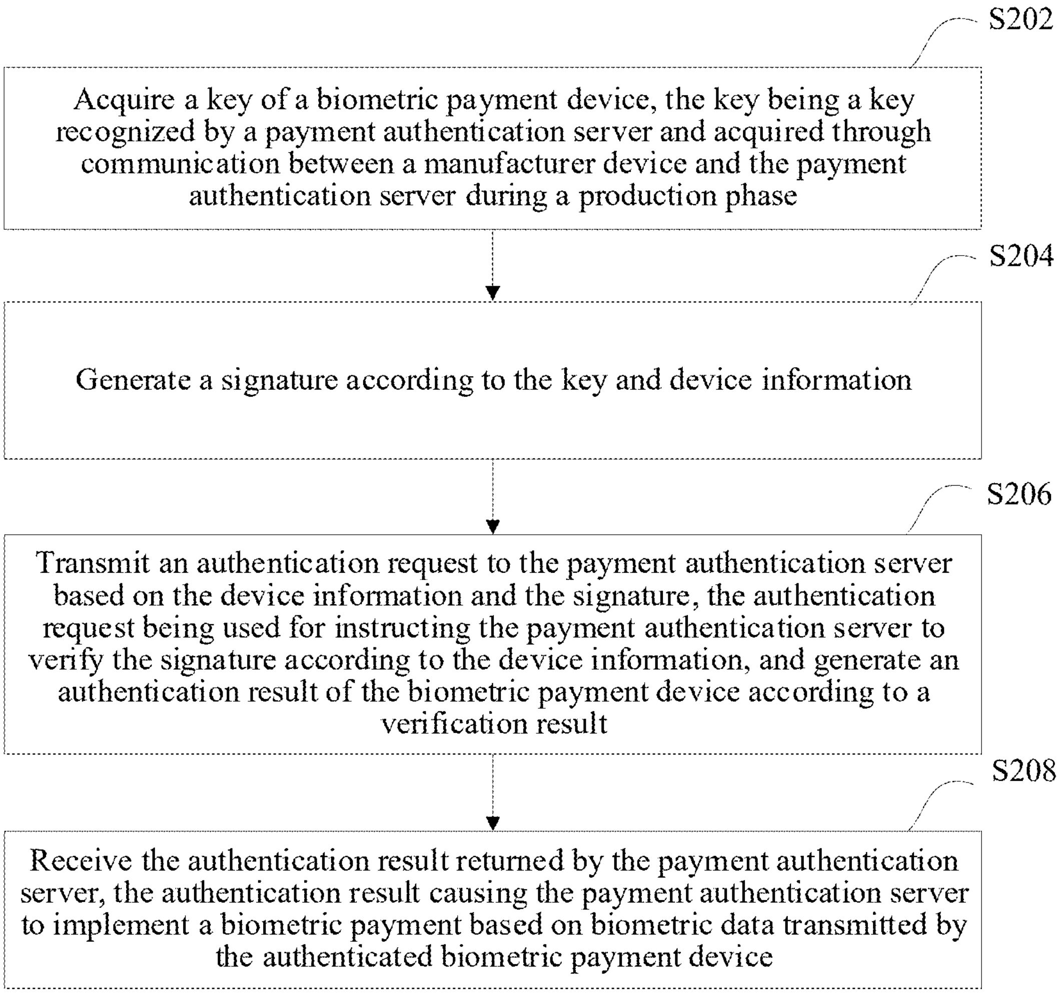
FIG. 2 is a schematic flowchart of an authentication method of a biometric payment device according to an embodiment.

In one embodiment, as shown in FIG. 2, an authentication method of a biometric payment device is provided. Taking the method applied to the biometric payment device in FIG. 1 as an example for description, the method includes the following steps:

Step 202: Acquire a key of the biometric payment device, the key being a key recognized by a payment authentication server and acquired through communication between a manufacturer device and the payment authentication server during a production phase.

The biometric payment refers to a means of payment acquiring biometric data of a human body as a payment voucher. The biometric data of the human body includes fingerprints, faces, handwritings, voices, gait, or the like. The biometric data of the human body can be obtained by sensor(s) on the biometric payment device. Different from the code scanning payment in which the user generates a highly private payment code by operating a personal mobile phone, human body biometric data is a type of data that can be acquired through a public means. For example, a human face is acquired through a camera, sound is acquired through a microphone, gait is acquired through a camera, or the like. Therefore, in some way, human body feature data is a type of public data, requiring that the biometric payment device is authenticated, to ensure the security of a payment communication link.

To ensure the security of the biometric payment, on the one hand, it is necessary to ensure from the source that the biometric payment device acquires a key used for authentication from a qualified device produced by a manufacturer certified by a payment platform; on the other hand, when being used as a cashier terminal of a merchant, the biometric payment device communicates with the payment authentication server, generates a signature according to the key, and establishes a secure link between the biometric payment device and the payment authentication server after the payment authentication server verifies the signature.

The manufacturer refers to a manufacturer of the biometric payment device. The manufacturer acquires the qualification to produce the biometric payment device that can be authenticated by the payment platform by entering a merchant platform of the payment platform as a merchant of the payment platform. The biometric payment device produced by the manufacturer needs to be verified and accepted by the payment platform, and then be sold to a merchant as a cashier terminal of the merchant.

The manufacturer device is a communication tool between the manufacturer and the payment authentication server, and is an auxiliary tool for device production. After the production of the biometric payment device is completed, the manufacturer device communicates with the payment authentication server to acquire a device key recognized by the payment authentication server.

In an implementation, a method for acquiring the device key is to generate public and private keys on the biometric payment device in a production phase, and export the public key to the manufacturer device. Because the manufacturer has been certified by the payment platform, the public key can be uploaded to the payment authentication server through the manufacturer device. That is, the private key is generated and stored locally in the biometric payment device, and the public key is uploaded to the payment authentication server. Because the public key is uploaded by the qualified manufacturer device, and the payment authentication server has a public key matching the biometric payment device, a local private key of the biometric payment device is a key recognized by the payment authentication server.

In an implementation, a method for acquiring the device key is to export the device information of the biometric payment device to the manufacturer device in the production phase. Because the manufacturer has been certified by the payment platform, the device information can be uploaded to the payment authentication server through the manufacturer device, the payment authentication server generates the key according to the device information, and returns the key to the manufacturer device, and the manufacturer device burns the key to the biometric payment device. Because the key is generated by the payment authentication server according to the device information, the key is recognized by the payment authentication server.

Step 204: Generate a signature according to the key and device information.

Specifically, the biometric payment device generates a signature on the device information according to the key, that is, the device information is encrypted by using the key, and the ciphertext obtained is the signature of the transmission process. The device information refers to information that can identify an identity of the biometric payment device, which may be a device ID, a device MAC address, or the like.

Step 206: Transmit an authentication request to the payment authentication server based on the device information and the signature, the authentication request being used for instructing the payment authentication server to verify the signature according to the device information, and generate an authentication result of the biometric payment device according to a verification result.

The biometric payment device transmits the authentication request to the payment authentication server based on the device information and the signature. The device information transmitted to the payment authentication server is the same as the device information used by the biometric payment device for generating the signature. After receiving the authentication request, the payment authentication server acquires a decryption method corresponding to the biometric payment device according to a device ID. For example, a public key or a decryption rule corresponding to the device information is acquired, the signature is decrypted according to the public key and a key rule to acquire the device information, whether decrypted device information is consistent with received device information is verified, and the authentication result for the biometric payment device is generated according to the verification result.

If the decrypted device information is consistent with the received device information, the signature verification is passed, a verification passing result of the signature verification is obtained, and an authentication passing result of the biometric payment device is further obtained. If the decrypted device information is inconsistent with the received device information, the signature verification fails, a verification failure result of the signature verification is obtained, and an authentication failure result of the biometric payment device is further obtained.

Step 208: Receive the authentication result returned by the payment authentication server, the authentication result causing the payment authentication server to implement a biometric payment based on biometric data transmitted by the authenticated biometric payment device.

Specifically, after being authenticated, the payment authentication server registers the authenticated biometric payment device, and establishes a secure link between the biometric payment device and the payment authentication server. The biometric payment device acquires the biometric data, and transmits the acquired biometric data and the device ID to the payment authentication server. The payment authentication server determines whether the biometric payment device is an authenticated device according to the device ID. If so, the acquired biometric data is matched with feature data of the user stored in a database, a payment code is generated according to matched user account information, and the payment code is returned to the biometric payment device. The biometric payment device initiates payment to the payment authentication server according to the payment code, and the payment authentication server deducts the payment from the corresponding account. If the authentication server determines that the biometric payment device is a non-authenticated device according to the device ID, the payment request of the biometric payment device is neglected, and the biometric payment device is determined as an illegal device to ensure the payment account security of the user.

In the foregoing authentication method of the biometric payment device, the key of the biometric payment device is the key recognized by the payment authentication server and acquired through the communication between the manufacturer device and the payment authentication server in the production phase, and then signature information is generated by using the key, and transmitted to the payment authentication server for verification, the signature being generated according to the key on the biometric payment device. The key has a relatively high security level, and another terminal cannot acquire the key to generate the signature and pretend to be the device for device authentication. The payment authentication server can determine, according to the authentication result, which device is the device transmitting the biometric data and whether the device is a device authenticated by the payment platform. The payment code can only be acquired on the payment authentication server side by using the biometric data acquired by the biometric payment device authenticated by the payment authentication server, so that the security performance of the biometric payment is ensured.

In another embodiment, a method for acquiring the key recognized by the payment authentication server through the communication between the manufacturer device and the payment authentication server during the production phase includes: generating a public key and a private key according to a key production instruction; and exporting the public key to the manufacturer device, where the manufacturer device uploads the public key to the payment authentication server.

Figure 3:
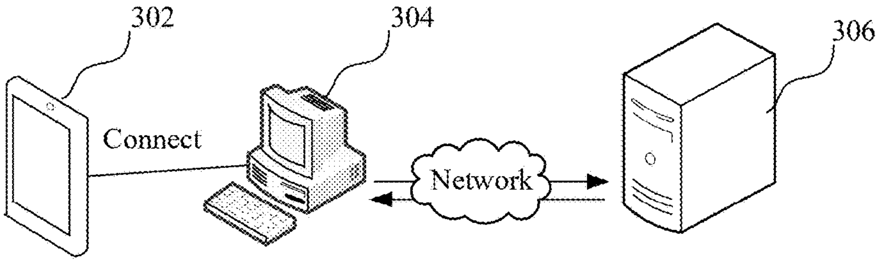
FIG. 3 is a schematic diagram of a production environment of a biometric payment device according to an embodiment.

Specifically, after the hardware production of the biometric payment device is completed, the device key needs to be configured before leaving the factory. FIG. 3 is a schematic diagram of a production environment. A biometric payment device 302 is connected to a manufacturer device 304, and the manufacturer device 304 is communicatively connected to a payment authentication server 306.

The key production instruction refers to an instruction used for initiating the generation of the public key and the private key during the production process of the biometric payment device. Specifically, after the hardware production of the biometric payment device is completed, the biometric payment device is equipped with an operating system, and the operating system is run, to generate the public key and the private key according to the key production instruction.

The public key and the private key are a key pair obtained by using an asymmetric encryption algorithm, one of which is made public to the outside world, and is referred to as the public key, and the other one is kept for oneself, and is referred to as the private key. The key pair obtained by using the algorithm can be guaranteed to be unique in the world. When using the key pair, if one key of the key pair is used for encrypting a piece of data, the other key has to be used for decryption. For example, if encryption is performed with the private key, decryption has to be performed with the public key; otherwise, the decryption will not succeed.

In the present disclosure, the private key is held by the owner of the key pair, that is, the private key is held by the biometric payment device and cannot be published, and the public key is published by the key pair holder to the payment authentication server. Specifically, the public key is published to the payment authentication server through the manufacturer device recognized by the payment authentication server. The payment authentication server acquires the public key corresponding to the private key of the biometric payment device, and can decrypt an encrypted file of the private key. Therefore, the private key in the biometric payment device is recognized by the payment authentication server, and the public key in the payment authentication server can decrypt data of the biometric payment device encrypted by using the private key.

In this embodiment, the public key and the private key are generated in the biometric payment device, the private key is not exported, and only the public key is exported to the payment authentication server, so that the key of the biometric payment device cannot be copied, which prevents the biometric payment device from being pretended, and ensures the security performance of the biometric payment.

In one embodiment, the biometric payment device is equipped with a secure element (SE). The SE is a hardware chip independent of a main chip of the biometric payment device, which can prevent external malicious parsing attacks and protect the security of core sensitive data. There is a cryptographic algorithm logic circuit in the chip, which can provide secure cryptographic algorithm services to the outside world. The SE not only protects against logical attacks from the software layer, but also resists physical attacks, and protects the data stored therein even if being physically destroyed or disassembled.

Figure 4:
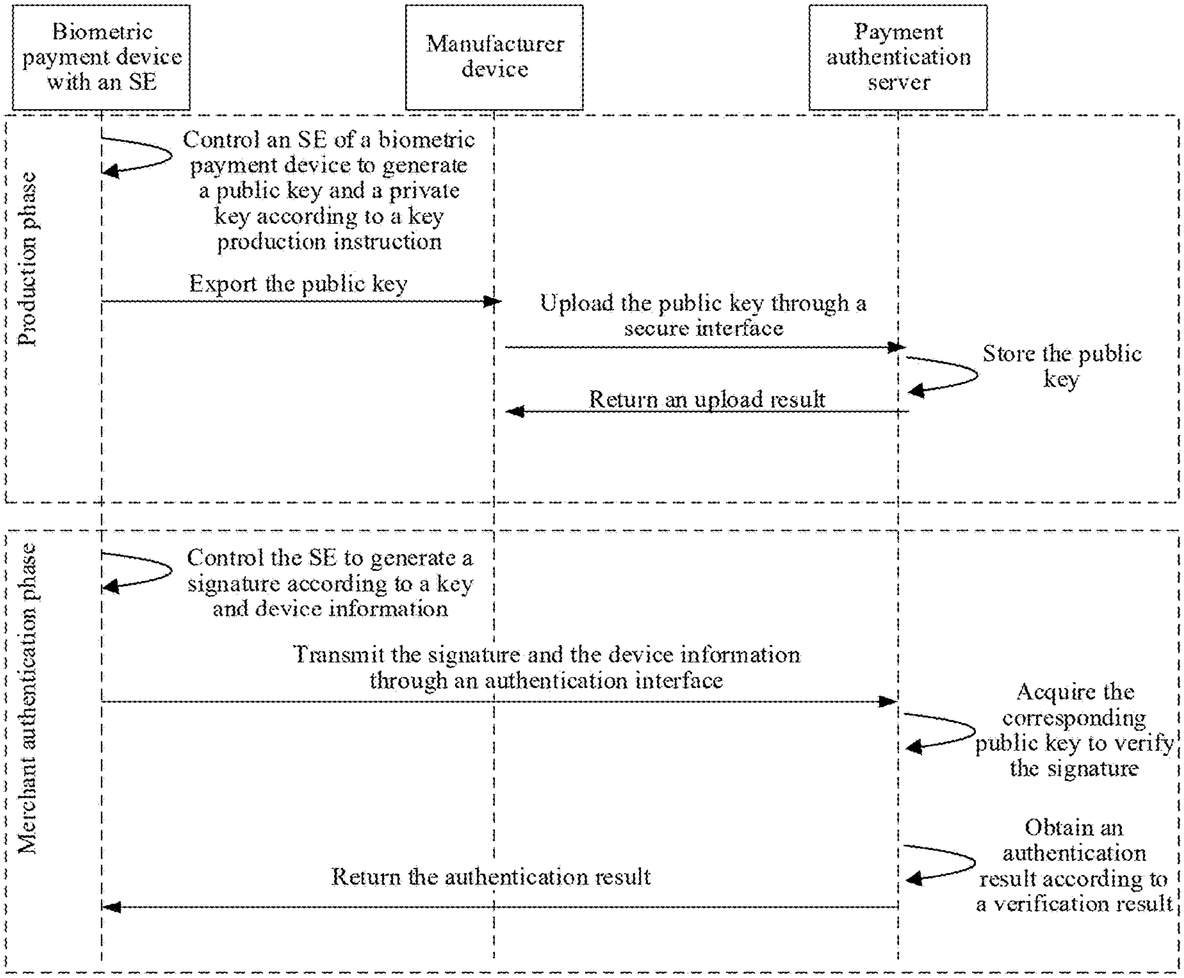
FIG. 4 is a schematic flowchart of an authentication process of a biometric payment device with a secure element (SE) according to an embodiment.

As shown in FIG. 4, the authentication of the biometric payment device using the SE includes two phases:

The first phase is the production phase: the key recognized by the payment authentication server is acquired through the communication between the manufacturer device and the payment authentication server during the production phase.

Specifically, the biometric payment device is connected to the SE, and the SE of the biometric payment device is controlled to generate the public key and the private key according to the key production instruction.

Specifically, the main chip of the biometric payment device controls the SE to generate the public key and the private key by using the key generation method of the SE. Compared with the main chip of the biometric payment, the SE is an independent hardware environment. The public key and the private key generated by the SE are isolated from the main chip in hardware. Even if the main chip is attacked, the security of the key can still be ensured. Therefore, using the SE to generate the public key and the private key has a high security level.

The biometric payment device exports the public key to the manufacturer device, and the manufacturer device uploads the public key to the payment authentication server through a secure interface.

Specifically, according to the Chinese National Cryptography Standard of an SE, only the public key of an encrypted key can be exported, and the private key cannot be exported. The public key is uploaded to the payment authentication server by using the manufacturer device, so that the payment authentication server holds the public key of the biometric payment device, and the payment authentication server has the ability to decrypt the data encrypted by using the private key of the biometric payment device. In an actual application, the manufacturer device uploads the device ID and the public key to the payment authentication server together, and the payment authentication server establishes a correspondence between the device ID and the public key, which is convenient for subsequent quick search for the corresponding public key matching the biometric payment device.

The manufacturer is authenticated by the payment platform and has the production qualification. Therefore, the public key uploaded by the manufacturer is recognized by the payment authentication server, and then the payment authentication server recognizes the private key corresponding to the public key. The payment authentication server establishes the correspondence between the device ID and the public key, and returns an upload result to the manufacturer device. So far, the first phase of the authentication is completed, the public key is uploaded to the payment authentication server, and the private key is stored in the SE of the biometric payment device.

The second phase is the merchant authentication phase. The biometric payment device on the merchant side uses the private key recognized by the payment authentication server for authentication to the payment authentication server, to establish a secure link between the biometric payment device and the payment authentication server.

When the biometric payment device on the merchant side needs to be communicatively connected to the payment authentication server, the authentication to the payment authentication server is required to establish a secure communication link with the payment authentication server.

First, the biometric payment device on the merchant side controls the SE to generate a signature according to the private key and the device information.

In this embodiment, the signature is generated in the SE, which can prevent the signature from being migrated. The signature is generated for the device information according to the private key to prevent the device information from being tampered with during the transmission process. To improve the timeliness of the signature, further, the private key may be used for signing the device information and a timestamp. Therefore, the payment authentication server verifies whether the device information is tampered with, and also verifies the validity of time, which further improves the payment security. Secondly, by transmitting the signature to the payment authentication server, the payment authentication server acquires the public key corresponding to the private key to verify the signature. Specifically, after receiving the authentication request, the payment authentication server acquires the corresponding public key according to the device information. The public key is used for verifying the signature, the signature is decrypted according to the public key to acquire the device information, and whether decrypted device information is consistent with received device information is verified, to obtain a verification result of the signature.

Moreover, the timestamp of the signature is further verified, and the validity period of the signature is verified according to the current time and the timestamp in the signature information, which further improves the payment security. If the decrypted device information is consistent with the received device information and the time is valid, the signature verification is passed, and an authentication passing result of the biometric payment device is obtained. If the decrypted device information is inconsistent with the received device information, or the time exceeds the validity period, the signature verification fails, and an authentication failure result of the biometric payment device is obtained.

Thirdly, the payment authentication server returns the authentication result to the biometric payment device, the authentication result causing the payment authentication server to implement the biometric payment based on the biometric data transmitted by the authenticated biometric payment device.

Specifically, after being authenticated, the payment authentication server registers the authenticated biometric payment device, and establishes a secure link between the biometric payment device and the payment authentication server. The biometric payment device acquires the biometric data, and transmits the acquired biometric data and the device ID to the payment authentication server. The payment authentication server determines whether the biometric payment device is an authenticated device according to the device ID. If so, the acquired biometric data is matched with feature data of the user stored in a database, a payment code is generated according to matched user account information, and the payment code is returned to the biometric payment device. The biometric payment device initiates payment to the payment authentication server according to the payment code, and the payment authentication server deducts the payment from the corresponding account. If the authentication server determines that the biometric payment device is a non-authenticated device according to the device ID, the payment request of the biometric payment device is neglected, and the biometric payment device is determined as an illegal device to ensure the payment account security of the user.

In this embodiment, by using the SE, the public and private keys and the signature are generated from isolated hardware, the public key is only exported once, and the private key cannot be exported, so that the key of the biometric payment device cannot be copied, which prevents the biometric payment device from being pretended. The isolation from hardware allows the authentication method to have the highest level of security.

In one embodiment, the biometric payment device is equipped with a trusted execution environment (TEE). The TEE draws on the idea of trusted computing technology and aims to protect security-sensitive code execution and related data information from being attacked and destroyed by malicious adversaries, which is the basis for establishing a trusted mobile terminal platform. The TEE mainly includes a micro-kernel operating system, which is isolated from a rich execution environment including a common terminal operating system. The TEE can resist attacks from the software layer, which has a security protection capability lower than that of the SE.

Figure 5:
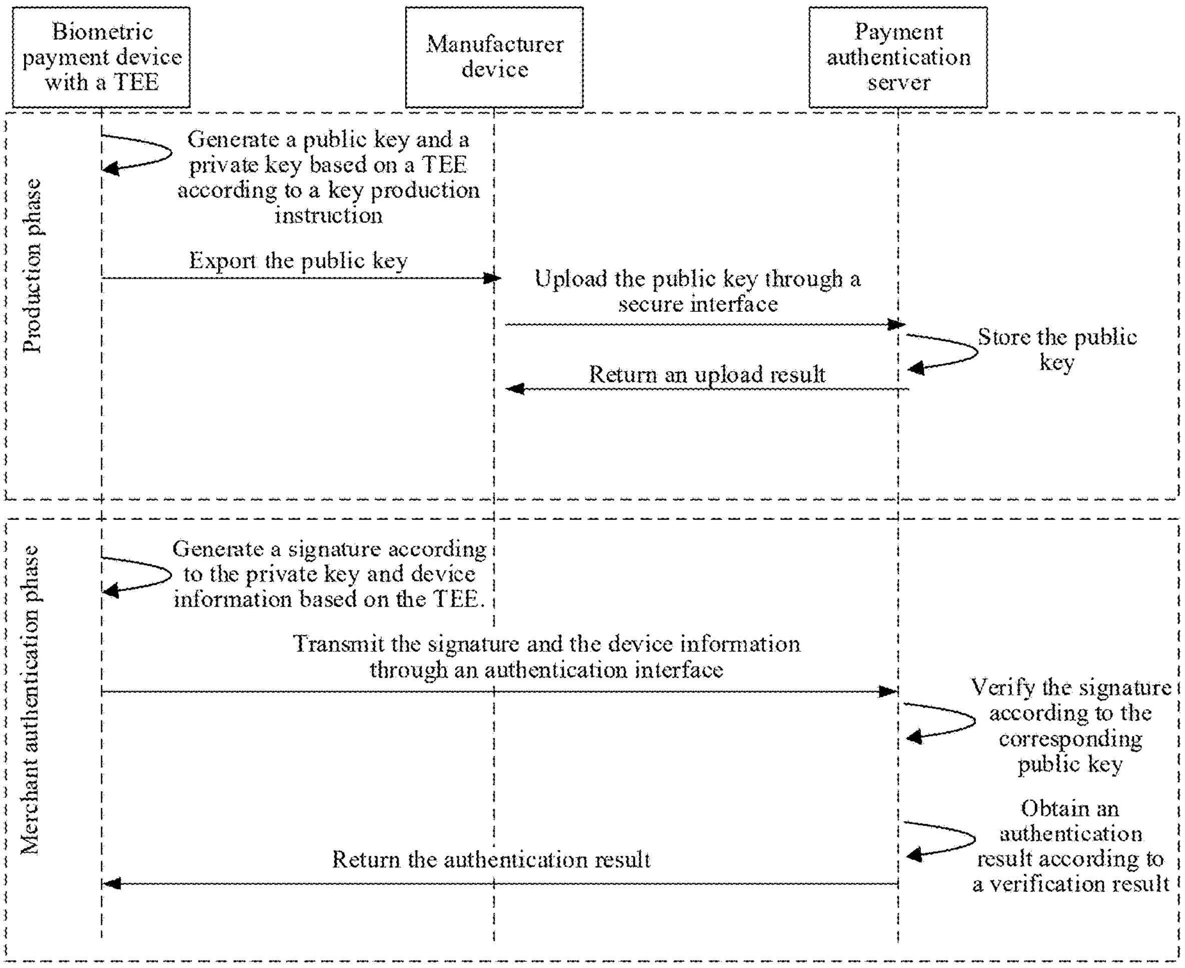
FIG. 5 is a schematic flowchart of an authentication process of a biometric payment device with a trusted execution environment (TEE) according to an embodiment.

As shown in FIG. 5, the implementation of the authentication of the biometric payment device by using the TEE includes two phases:

The first phase is the production phase: the key recognized by the payment authentication server is acquired through the communication between the manufacturer device and the payment authentication server during the production phase.

Specifically, the biometric payment device is equipped with the TEE, and generates the public key and the private key based on the TEE. Because the TEE includes a micro-kernel operating system, which is isolated from a rich execution environment including a common terminal operating system, the key can be generated in isolation from the software, to improve the key security level.

The biometric payment device exports the public key to the manufacturer device, and the manufacturer device uploads the public key to the payment authentication server through a secure interface.

In this embodiment, the private key is generated in the TEE, the private key cannot be exported, and the public key is only exported once and uploaded to the payment authentication server. Therefore, the payment authentication server holds the public key of the biometric payment device, and the payment authentication server has the ability to decrypt the data encrypted by using the private key of the biometric payment device. In an actual application, the manufacturer device uploads the device ID and the public key to the payment authentication server together, and the payment authentication server establishes a correspondence between the device ID and the public key, which is convenient for subsequent quick search for the corresponding public key matching the biometric payment device.

The manufacturer is authenticated by the payment platform and has the production qualification. Therefore, the public key uploaded by the manufacturer is recognized by the payment authentication server, and then the payment authentication server recognizes the private key corresponding to the public key. The payment authentication server establishes the correspondence between the device ID and the public key, and returns an upload result to the manufacturer device. So far, the first phase of the authentication is completed, the public key is uploaded to the payment authentication server, and the private key is stored in the biometric payment device.

The second phase is the merchant authentication phase. The biometric payment device on the merchant side uses the private key recognized by the payment authentication server for authentication to the payment authentication server, to establish a secure link between the biometric payment device and the payment authentication server.

When the biometric payment device on the merchant side needs to be communicatively connected to the payment authentication server, the authentication to the payment authentication server is required to establish a secure communication link with the payment authentication server.

First, the biometric payment device on the merchant side generates a signature based on the TEE according to the private key and the device information.

Secondly, the signature is transmitted to the payment authentication server, and the payment authentication server acquires the public key corresponding to the private key to verify the signature.

Thirdly, the payment authentication server returns the authentication result to the biometric payment device, the authentication result causing the payment authentication server to implement the biometric payment based on the biometric data transmitted by the authenticated biometric payment device.

The authentication process is the same as that based on the SE. Details are not repeated herein again.

In this embodiment, by using the TEE, the public and private keys and the signature are generated from software, the public key is only exported once, and the private key cannot be exported, so that the key of the biometric payment device cannot be copied, which prevents the biometric payment device from being pretended. The isolation from software allows the authentication method to have a higher level of security.

Figure 6:
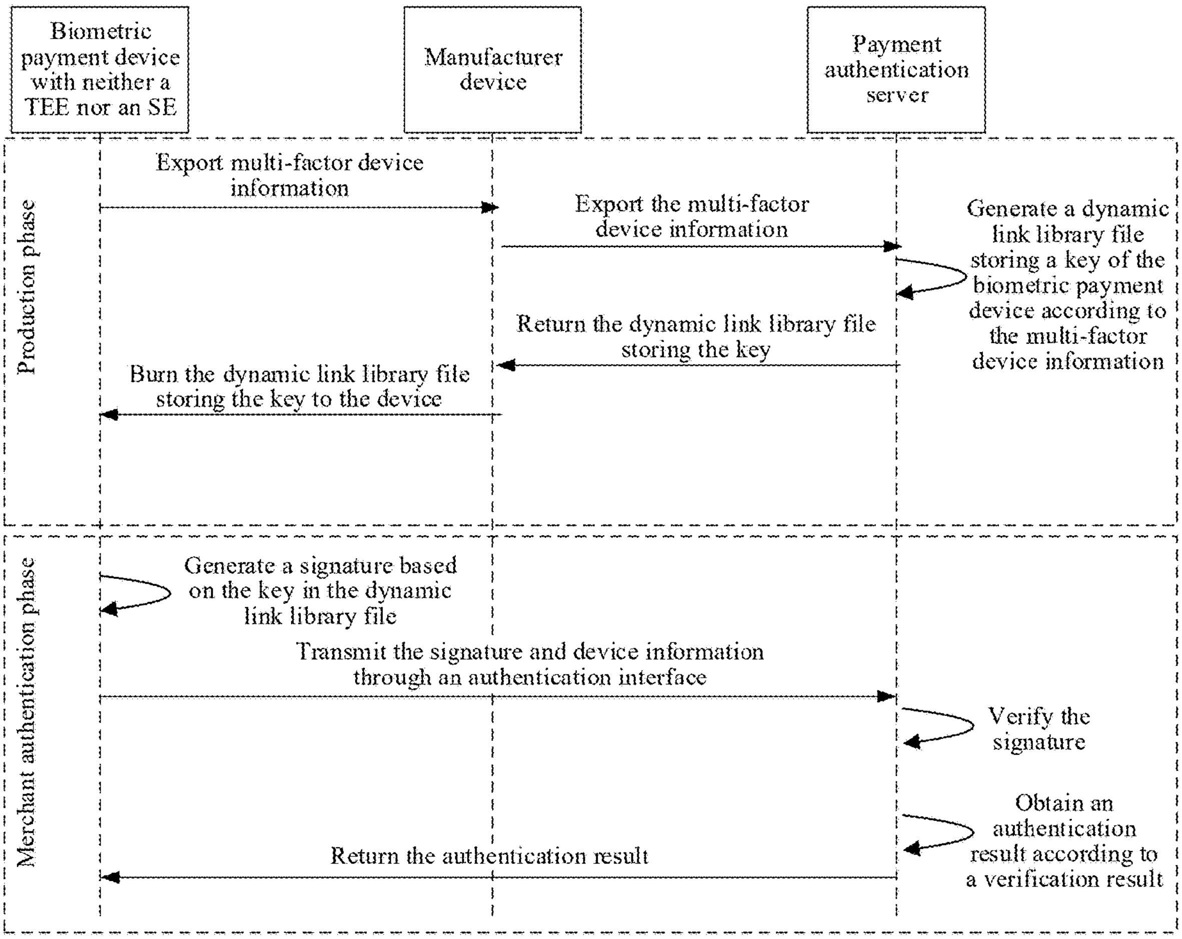
FIG. 6 is a schematic flowchart of an authentication process of a biometric payment device with neither an SE nor a TEE according to an embodiment.

In another embodiment, for a biometric payment device that does not support a TEE and does not have an SE, as shown in FIG. 6, the authentication of the biometric payment device includes two phases:

The first phase is the production phase. The key recognized by the payment authentication server is acquired through the communication between the manufacturer device and the payment authentication server during the production phase.

Specifically, the biometric payment device exports multi-factor device information to the manufacturer device, where the multi-factor device information is uploaded to the payment authentication server through the manufacturer device, and the payment authentication server generates a dynamic link library file storing the key of the biometric payment device according to the multi-factor device information.

The multi-factor device information includes device-related multi-factor device information, that is, multiple device information, for example, includes but is not limited to a brand name, a device name, a manufacturer name, a product name, a device MAC address, a device ID, a unique device identifier (UUID), a device serial number, or the like.

The payment authentication server generates the key according to the multi-factor device information, and stores the key by using the dynamic link library file. The dynamic link library file such as a shared object (SO) library file is a black box, and the payment authentication server uses the encryption rule of the black box to store the key in the dynamic link library file. Because the rule of the black box is encrypted, the rule for generating the key for the SO file is encrypted, and the key of the device cannot be copied.

The payment authentication server transmits the dynamic link library file storing the key to the manufacturer device, and the manufacturer device burns the dynamic link library file to the biometric payment device. Specifically, the biometric payment device burns the dynamic link library file returned by the payment authentication server received by the manufacturer device to the biometric payment device according to a burning instruction of the manufacturer device.

In this embodiment, for the biometric payment device with neither an SE nor a TEE, the key is generated by using the payment authentication server, and the key is burned to the biometric payment device by means of external import. To prevent the key from being stolen during external import, a reinforcement method may be adopted to store the key in the SO file, and the SO file is obfuscated and reinforced.

Specifically, the dynamic link library file burned to the biometric payment device is not lost when the device is restored to the factory setting, which ensures that the generated key is permanently stored in the biometric payment device.

The second phase is the merchant authentication phase. The biometric payment device on the merchant side uses the key recognized by the payment authentication server for authentication to the payment authentication server, to establish a secure link between the biometric payment device and the payment authentication server.

First, the key stored in the dynamic link library file is used for encrypting the device information to generate the signature.

Secondly, the signature is transmitted to the payment authentication server. The payment authentication server acquires the corresponding decryption rule of the corresponding dynamic link library file to verify the signature, obtains the decrypted device information, and verifies whether the decrypted device information is consistent with the received device information.

Thirdly, the payment authentication server returns the authentication result to the biometric payment device, the authentication result causing the payment authentication server to implement the biometric payment based on the biometric data transmitted by the authenticated biometric payment device.

In this embodiment, for a biometric payment device with neither an SE chip nor a TEE, a dynamic link library file used for storing the key is generated by the payment authentication server according to the multi-factor device information of the biometric payment device, and then the dynamic link library file storing the key is imported into the biometric payment device through the manufacturer device. The key is stored in the SO file, the encryption and decryption operations are both performed in the SO file, the key is generated through the SO file of the black box, and the rule of the black box is encrypted. Therefore, the device key cannot be copied, which improves the key security.

Further, for the SO file storing the key, the payment authentication server also uses the method of obfuscation and reinforcement to improve the security level of the SO file, so that the SO file cannot be easily decompiled. The SO file is a binary file. An obfuscation tool is used for obfuscating the code of the binary file, so that the code sequence of the SO file is scrambled for anti-reverse protection. The SO file encrypted by using a reinforcement program cannot be decompiled, which further improves the key security.

Considering the security authentication of a biometric payment device with an SE, a biometric payment device with a TEE, and a biometric payment device with neither an SE nor a TEE, the foregoing authentication method of the biometric payment device is compatible with the authentication of almost all biometric payment devices, and has wide applicability.

Considering the particularity of the biometric payment, in the authentication method of the biometric payment device of the present disclosure, signature information is generated by using a key with a higher security level, and is transmitted to the payment authentication server for signature verification. Another terminal cannot acquire the key to generate a signature to pretend to be the device for device authentication. The payment authentication server can determine which device is transmitting the biometric data according to the authentication result and whether the device is a device authenticated by the payment platform. The payment code can only be acquired on the payment authentication server side by using the biometric data acquired by the biometric payment device authenticated by the payment authentication server, so that the security performance of the biometric payment is ensured.

The authentication method of the biometric payment device of the present disclosure can be applied to face payment, fingerprint payment, voiceprint payment, or the like.

Figure 7:
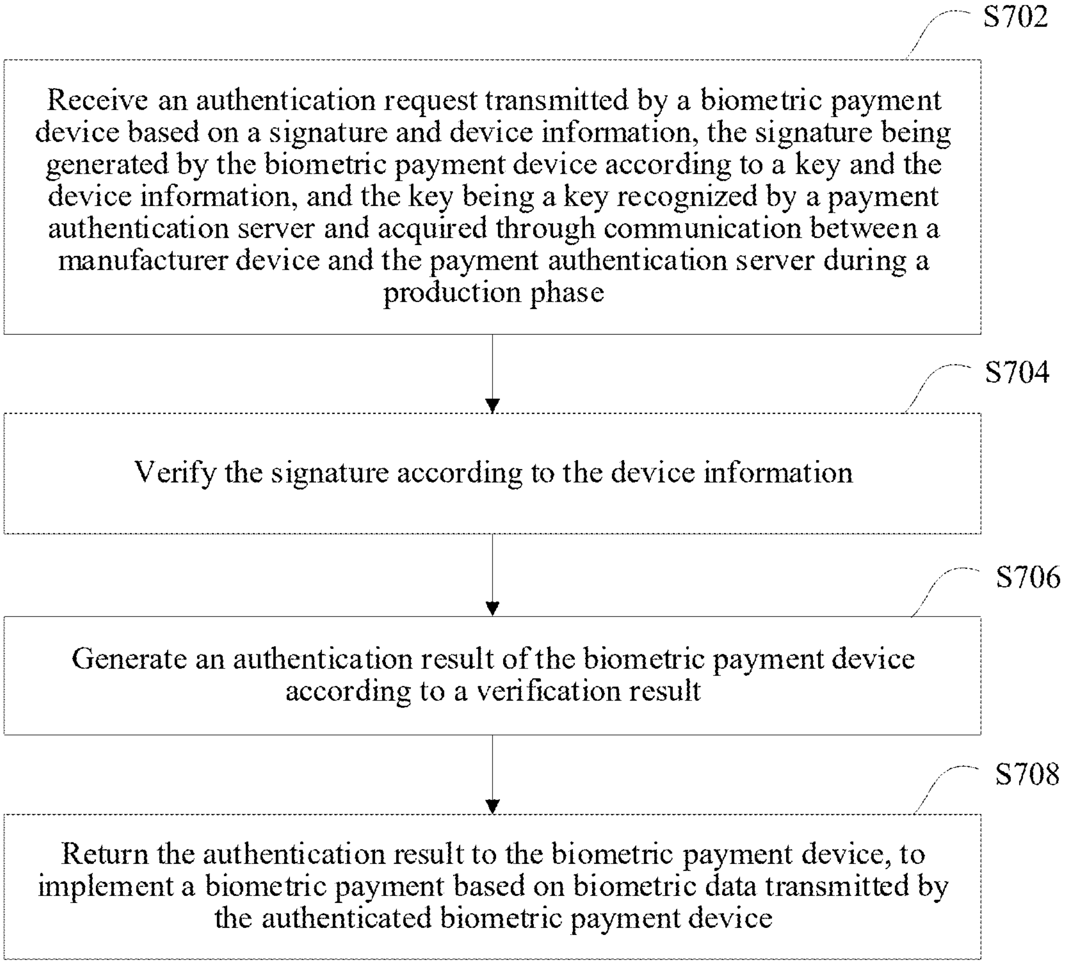
FIG. 7 is a schematic flowchart of an authentication method of a biometric payment device according to another embodiment.

As shown in FIG. 7, an authentication method of a biometric payment device is provided. Taking the method applied to the payment authentication server in FIG. 1 as an example for description, the method includes:

Step 702: Receive an authentication request transmitted by the biometric payment device based on a signature and device information, the signature being generated by the biometric payment device according to a key and the device information, and the key being a key recognized by the payment authentication server and acquired through communication between a manufacturer device and the payment authentication server during a production phase.

The biometric payment refers to a means of payment acquiring biometric data of a human body as a payment voucher. The biometric data of the human body includes fingerprints, faces, handwritings, voices, gait, or the like. Different from the code scanning payment in which the user generates a highly private payment code by operating a personal mobile phone, human body biometric data is a type of data that can be acquired through a public means. For example, a human face is acquired through a camera, sound is acquired through a microphone, gait is acquired through a camera, or the like. Therefore, in some way, human body feature data is a type of public data, requiring that the biometric payment device is authenticated, to ensure the security of a payment communication link.

To ensure the security of the biometric payment, on the one hand, it is necessary to ensure from the source that the biometric payment device acquires a key used for authentication from a qualified device produced by a manufacturer certified by a payment platform; on the other hand, when being used as a cashier terminal of a merchant, the biometric payment device communicates with the payment authentication server, generates a signature according to the key, and establishes a secure link between the biometric payment device and the payment authentication server after the payment authentication server verifies the signature.

In an implementation, a method for acquiring the device key is to generate public and private keys on the biometric payment device in a production phase, and export the public key to the manufacturer device. Because the manufacturer has been certified by the payment platform, the public key can be uploaded to the payment authentication server through the manufacturer device. That is, the private key is generated and stored locally in the biometric payment device, and the public key is uploaded to the payment authentication server. Because the public key is uploaded by the qualified manufacturer device, and the payment authentication server has a public key matching the biometric payment device, a local private key of the biometric payment device is a key recognized by the payment authentication server.

In an implementation, a method for acquiring the device key is to export the device information of the biometric payment device to the manufacturer device in the production phase. Because the manufacturer has been certified by the payment platform, the device information can be uploaded to the payment authentication server through the manufacturer device, the payment authentication server generates the key according to the device information, and returns the key to the manufacturer device, and the manufacturer device burns the key to the biometric payment device. Because the key is generated by the payment authentication server according to the device information, the key is recognized by the payment authentication server.

Step 704: Verify the signature according to the device information.

Specifically, the biometric payment device generates a signature on the device information according to the key, that is, the device information is encrypted by using the key, and the ciphertext obtained is the signature of the transmission process. The device information refers to information that can identify an identity of the biometric payment device, which may be a device ID, a device MAC address, or the like.

The biometric payment device transmits the authentication request to the payment authentication server based on the device information and the signature. The device information transmitted to the payment authentication server is the same as the device information used by the biometric payment device for generating the signature. After receiving the authentication request, the payment authentication server acquires a decryption method corresponding to the biometric payment device according to a device ID. For example, a public key or a decryption rule corresponding to the device information is acquired, the signature is decrypted according to the public key and a key rule to acquire the device information, whether decrypted device information is consistent with received device information is verified, and the authentication result for the biometric payment device is generated according to the verification result.

Step 706: Generate an authentication result of the biometric payment device according to a verification result.

If the decrypted device information is consistent with the received device information, the signature verification is passed, a verification passing result of the signature verification is obtained, and an authentication passing result of the biometric payment device is further obtained. If the decrypted device information is inconsistent with the received device information, the signature verification fails, a verification failure result of the signature verification is obtained, and an authentication failure result of the biometric payment device is further obtained.

Step 708: Return the authentication result to the biometric payment device, to implement a biometric payment based on biometric data transmitted by the authenticated biometric payment device.

Specifically, after being authenticated, the payment authentication server registers the authenticated biometric payment device, and establishes a secure link between the biometric payment device and the payment authentication server. The biometric payment device acquires the biometric data, and transmits the acquired biometric data and the device ID to the payment authentication server. The payment authentication server determines whether the biometric payment device is an authenticated device according to the device ID. If so, the acquired biometric data is matched with feature data of the user stored in a database, a payment code is generated according to matched user account information, and the payment code is returned to the biometric payment device. The biometric payment device initiates payment to the payment authentication server according to the payment code, and the payment authentication server deducts the payment from the corresponding account. If the authentication server determines that the biometric payment device is a non-authenticated device according to the device ID, the payment request of the biometric payment device is neglected, and the biometric payment device is determined as an illegal device to ensure the payment account security of the user.

In the foregoing authentication method of the biometric payment device, the key of the biometric payment device is the key recognized by the payment authentication server and acquired through the communication between the manufacturer device and the payment authentication server in the production phase, then signature information is generated by using the key, and transmitted to the payment authentication server for verification, the signature being generated according to the key on the biometric payment device. The key has a relatively high security level, and another terminal cannot acquire the key to generate the signature and pretend to be the device for device authentication. The payment authentication server can determine which device is transmitting the biometric data according to the authentication result and whether the device is a device authenticated by the payment platform. The payment code can only be acquired on the payment authentication server side by using the biometric data acquired by the biometric payment device authenticated by the payment authentication server, so that the security performance of the biometric payment is ensured.

In another embodiment, a method for acquiring the key recognized by the payment authentication server through the communication between the manufacturer device and the payment authentication server during the production phase includes: acquiring a public key of the biometric payment device uploaded by the manufacturer device, where the public key and a private key corresponding to the public key are generated according to a key production instruction, and the public key is exported to the manufacturer device. Specifically, after the hardware production of the biometric payment device is completed, the device key needs to be configured before leaving the factory. FIG. 3 is a schematic diagram of a production environment. A biometric payment device 302 is connected to a manufacturer device 304, and the manufacturer device 304 is communicatively connected to a payment authentication server 306.

The key production instruction refers to an instruction used for initiating the generation of the public key and the private key during the production process of the biometric payment device. Specifically, after the hardware production of the biometric payment device is completed, the biometric payment device is equipped with an operating system, and the operating system is run, to generate the public key and the private key according to the key production instruction.

In the present disclosure, the private key is held by the owner of the key pair, that is, the private key is held by the biometric payment device and cannot be published, and the public key is published by the key pair holder to the payment authentication server. Specifically, the public key is published to the payment authentication server through the manufacturer device recognized by the payment authentication server. The payment authentication server acquires the public key corresponding to the private key of the biometric payment device, and can decrypt an encrypted file of the private key. Therefore, the private key in the biometric payment device is recognized by the payment authentication server, and the public key in the payment authentication server can decrypt data of the biometric payment device encrypted by using the private key.

In this embodiment, the public key and the private key are generated in the biometric payment device, the private key is not exported, and only the public key is exported to the payment authentication server, so that the key of the biometric payment device cannot be copied, which prevents the biometric payment device from being pretended, and ensures the security performance of the biometric payment.

In one embodiment, the biometric payment device is connected to the SE, and the SE of the biometric payment device is controlled to generate the public key and the private key according to the key production instruction. The biometric payment device exports the public key to the manufacturer device, and the manufacturer device uploads the public key and the device ID to the payment authentication server through a secure interface. The biometric payment device on the merchant side controls the SE to generate a signature according to the private key and the device information.

In another embodiment, the biometric payment device is equipped with a TEE, and generates the public key and the private key based on the TEE. The biometric payment device exports the public key to the manufacturer device, and the manufacturer device uploads the public key and the device ID to the payment authentication server through a secure interface. The biometric payment device on the merchant side generates a signature based on the TEE according to the private key and the device information.

Further, the payment authentication server acquires the corresponding public key, and verifies the signature according to the device information and the public key.

In another embodiment, a method for acquiring the key recognized by the payment authentication server through the communication between the manufacturer device and the payment authentication server during the production phase includes: acquiring multi-factor device information of the biometric payment device uploaded by the manufacturer device; generating a dynamic link library file storing the key of the biometric payment device according to the multi-factor device information; and transmitting the dynamic link library file to the manufacturer device, the dynamic link library file being used for instructing the manufacturer device to burn the dynamic link library file to the biometric payment device.

The multi-factor device information includes device-related multi-factor device information, that is, multiple device information, for example, includes but is not limited to a brand name, a device name, a manufacturer name, a product name, a device MAC address, a device ID, a unique device identifier (UUID), a device serial number, or the like.

The payment authentication server generates the key according to the multi-factor device information, establishes a correspondence between the key and the multi-factor device information, stores the key by using the dynamic link library file, and transmits the key to the manufacturer device, to import the key into the biometric payment device. The dynamic link library file (an SO file) is a black box, and the payment authentication server uses the encryption rule of the black box to store the key in the dynamic link library file. Because the rule of the black box is encrypted, the rule for generating the key for the SO file is encrypted, and the key of the device cannot be copied.

Specifically, the biometric payment device burns the dynamic link library file returned by the payment authentication server received by the manufacturer device to the biometric payment device according to a burning instruction of the manufacturer device. The dynamic link library file burned to the biometric payment device is not lost when the device is restored to the factory setting, which ensures that the generated key is permanently stored in the biometric payment device.

In this embodiment, for a biometric payment device with neither an SE chip nor a TEE, a dynamic link library file used for storing the key is generated by the payment authentication server according to the multi-factor device information of the biometric payment device, and then the dynamic link library file storing the key is imported into the biometric payment device through the manufacturer device. The key is stored in the SO file, the encryption and decryption operations are both performed in the SO file, the key is generated through the SO file of the black box, and the rule of the black box is encrypted. Therefore, the device key cannot be copied, which improves the key security.

Further, the payment authentication server obfuscates and reinforces the dynamic link library file storing the key. An obfuscation tool is used for obfuscating the code of the binary file, so that the code sequence of the SO file is scrambled for anti-reverse protection. The SO file encrypted by using a reinforcement program cannot be decompiled, which further improves the key security.

It is to be understood that, although the steps in the flowcharts of FIG. 2, and FIG. 4 to FIG. 7 are sequentially displayed according to indication of arrows, the steps are not necessarily sequentially performed in the sequence indicated by the arrows. Unless otherwise explicitly specified in the present disclosure, execution of the steps is not strictly limited, and the steps may be performed in other sequences. In addition, at least some steps in FIG. 2, and FIG. 4 to FIG. 7 may include a plurality of steps or a plurality of stages. The steps or the stages are not necessarily performed at the same moment, and instead may be performed at different moments. The steps or the stages are not necessarily performed sequentially, and instead may be performed in turn or alternately with another step or at least some of steps or stages of another step.

Figure 8:
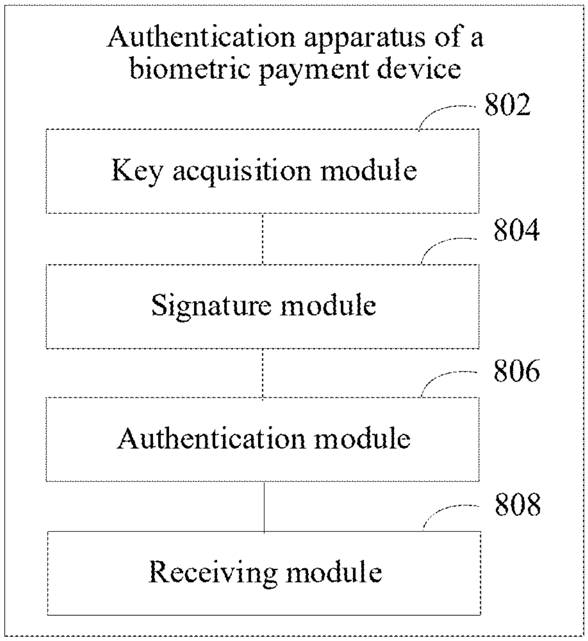
FIG. 8 is a structural block diagram of an authentication apparatus of a biometric payment device according to an embodiment.

In one embodiment, as shown in FIG. 8, an authentication apparatus of a biometric payment device is provided. The apparatus may adopt a software module or a hardware module, or a combination of the two to become a part of a computer device. The apparatus specifically includes:

a key acquisition module 802, configured to acquire a key of the device, the key being a key recognized by a payment authentication server and acquired through communication between a manufacturer device and the payment authentication server during a production phase;

a signature module 804, configured to generate a signature according to the key and device information;

an authentication module 806, configured to transmit an authentication request to the payment authentication server based on the device information and the signature, the authentication request being used for instructing the payment authentication server to verify the signature according to the device information, and generate an authentication result of the biometric payment device according to a verification result; and a receiving module 808, configured to receive the authentication result returned by the payment authentication server, the authentication result causing the payment authentication server to implement a biometric payment based on biometric data transmitted by the authenticated biometric payment device.

In another embodiment, the key acquisition module includes: a key generation module, configured to generate a public key and a private key according to a key production instruction;

a key export module, configured to export the public key to the manufacturer device, where the manufacturer device uploads the public key to the payment authentication server, and the key generation module is configured to control an SE of the biometric payment device to generate the public key and the private key according to the key production instruction; and a signature module, configured to control the SE to generate the signature according to the private key and the device information, where the key generation module is configured to generate the public key and the private key based on a TEE according to the key production instruction, and the signature module is configured to generate the signature according to the private key and the device information based on the TEE.

In another embodiment, the key acquisition module includes:

a device information export module, configured to export multi-factor device information to the manufacturer device, where the multi-factor device information is transmitted to the payment authentication server through the manufacturer device, and the payment authentication server generates a dynamic link library file storing the key of the biometric payment device according to the multi-factor device information; and a key import module, configured to locally burn, in response to a burning instruction of the manufacturer device, the dynamic link library file returned by the payment authentication server (and forwarded by the manufacturer device onto the biometric payment device).

In another embodiment, the dynamic link library file is an obfuscated and reinforced dynamic link library file, and the signature module is configured to generate the signature by encrypting the device information according to the key stored in the obfuscated and reinforced dynamic link library file.

Figure 9:
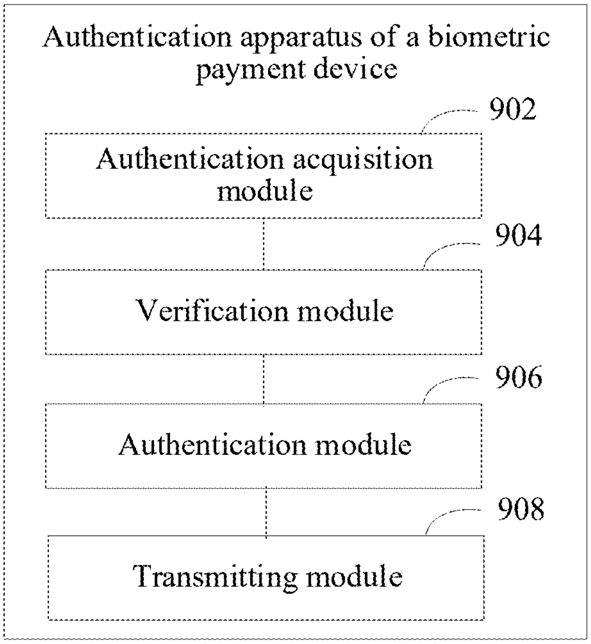
FIG. 9 is a structural block diagram of an authentication apparatus of a biometric payment device according to another embodiment.

An authentication apparatus of a biometric payment device is provided, as shown in FIG. 9, including:

an authentication acquisition module 902, configured to receive an authentication request transmitted by the biometric payment device based on a signature and device information, the signature being generated by the biometric payment device according to a key and the device information, and the key being a key recognized by a payment authentication server and acquired through communication between a manufacturer device and the payment authentication server during a production phase;

a verification module 904, configured to verify the signature according to the device information;

an authentication module 906, configured to generate an authentication result of the biometric payment device according to a verification result; and a transmitting module 908, configured to return the authentication result to the biometric payment device, to implement a biometric payment based on biometric data transmitted by the authenticated biometric payment device.

In another embodiment, a key acquisition module is further included, configured to acquire a public key and a device ID of the biometric payment device uploaded by the manufacturer device, where the public key and a private key corresponding to the public key are generated according to a key production instruction, and the public key is exported to the manufacturer device.

In another embodiment, the key acquisition module includes:

a device information acquisition module, configured to acquire multi-factor device information of the biometric payment device uploaded by the manufacturer device;

a key generation module, configured to generate a dynamic link library file storing the key of the biometric payment device according to the multi-factor device information; and a key transmitting module, configured to transmit the dynamic link library file to the manufacturer device, the dynamic link library file being used for instructing the manufacturer device to burn the dynamic link library file to the biometric payment device.

In another embodiment, a key processing module is further included, configured to obfuscate and reinforce the dynamic link library file storing the key.

For a specific limitation on the authentication apparatus of the biometric payment device, refer to the limitation on the authentication method of the biometric payment device above. Details are not described herein again. The modules in the foregoing authentication apparatus of the biometric payment device may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In one embodiment, a computer device is provided. The computer device may be a server, and a diagram of an internal structure thereof may be shown in FIG. 10. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store data of the biometric payment device. The network interface of the computer device is configured to communicate with an external terminal through a network connection. The computer program is executed by the processor to implement an authentication method of a biometric payment device.

In one embodiment, a computer device is provided. The computer device may be a terminal, and a diagram of an internal structure thereof may be shown in FIG. 11. The computer device includes a processor, a memory, a communication interface, a display screen, and a biometric data acquisition apparatus connected through a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is used for wired or wireless communication with an external terminal, and the wireless communication may be implemented by Wi-Fi, an operator network, near field communication (NFC) or another technology. The computer program is executed by the processor to implement an authentication method of a biometric payment device. The display screen of the computer device may be a liquid crystal display screen or an electronic ink display screen, and the biometric data acquisition device of the computer device may be an image acquisition device, a fingerprint acquisition device and/or a sound acquisition device.

Figure 10:
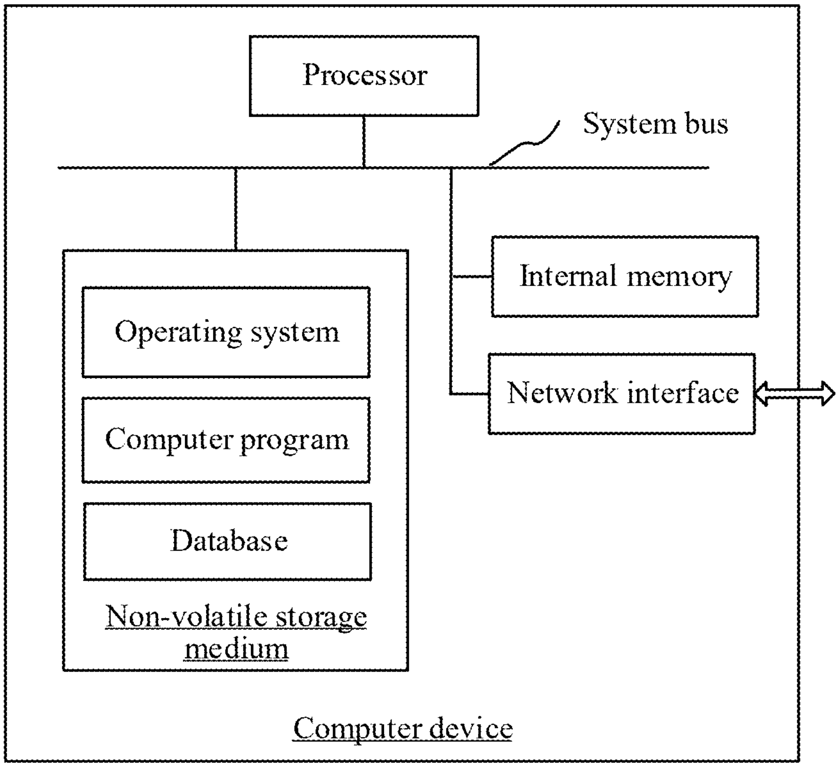
FIG. 10 is a diagram of an internal structure of a computer device according to an embodiment.
Figure 11:
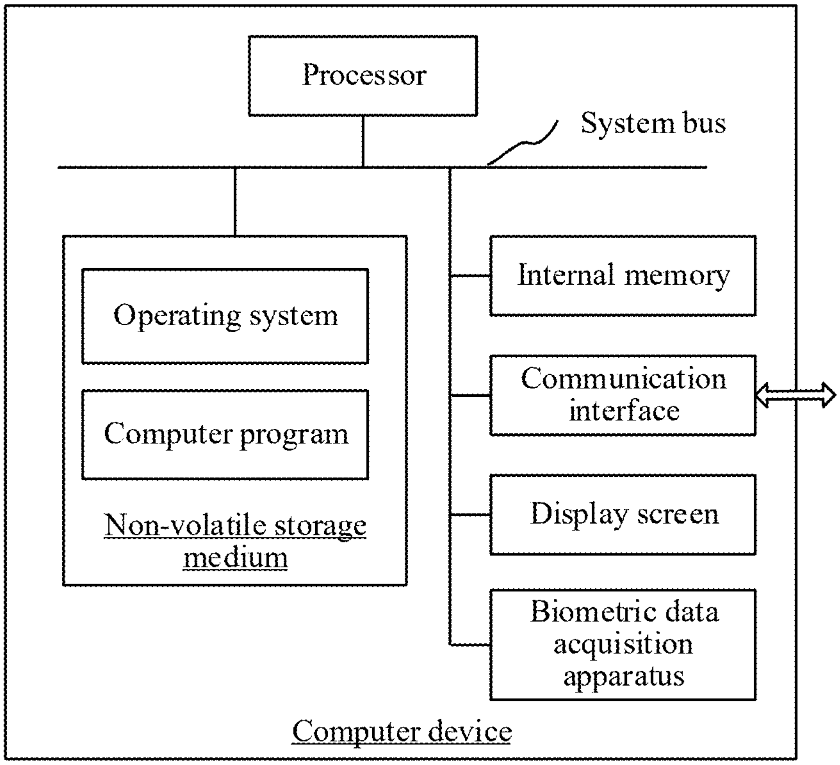
FIG. 11 is a diagram of an internal structure of a computer device according to another embodiment.

A person skilled in the art may understand that the structure shown in FIG. 10 and FIG. 11 is only a block diagram of a partial structure related to the solution of the present disclosure, and does not limit the computer device to which the solution of the present disclosure is applied. Specifically, the computer device may include more or fewer components than those shown in the figure, or some components may be combined, or different component deployment may be used.

In one embodiment, a computer device is further provided, including a memory and a processor, the memory storing a computer program, and the computer program, when executed by the processor, implementing the steps in the method embodiments.

In one embodiment, a computer-readable storage medium is provided, storing a computer program, the computer programs, when executed by a processor, implementing the steps in the method embodiments.

In one embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of procedures of the method in the foregoing embodiments may be implemented by a computer program instructing relevant hardware. The program may be stored in a non-volatile computer-readable storage medium. When the computer program is executed, the procedures of the foregoing method embodiments may be implemented. Any reference to a memory, a storage, a database, or another medium used in the embodiments provided in the present disclosure may include at least one of a non-volatile memory and a volatile memory. The non-volatile memory may include a read-only memory (ROM), a magnetic tape, a floppy disk, a flash memory, an optical memory, or the like. The volatile memory may include a random access memory (RAM) or an external cache memory. For the purpose of description instead of limitation, the RAM is available in a plurality of forms, for example, a static RAM (SRAM) or a dynamic RAM (DRAM).

Technical features of the foregoing embodiments may be combined in different manners to form other embodiments.

To make description concise, not all possible combinations of the technical features in the foregoing embodiments are described. However, the combinations of these technical features shall be considered as falling within the scope recorded by this specification provided that no conflict exists.

The foregoing embodiments merely express several implementations of the present disclosure. The descriptions thereof are relatively specific and detailed, but are not to be understood as limitations to the scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. An authentication method of a biometric payment device, performed by a payment authentication server, comprising:

generating a public key corresponding to the biometric payment device, comprising:

receiving multi-factor device information of the biometric payment device uploaded by a manufacturer device;

generating a dynamic link library file storing a key of the biometric payment device according to the multi-factor device information;

obfuscating and reinforcing, at the payment authentication server, a code of the dynamic link library file, to obtain a reinforced dynamic link library file;

transmitting the reinforced dynamic link library file to the biometric payment device through the manufacturer device, the reinforced dynamic link library file being locally burned to the biometric payment device; and receiving, through the manufacturer device, the public key corresponding to the biometric payment device, wherein the public key is generated together with a private key by the biometric payment device based on the reinforced dynamic link library file; and authenticating the biometric payment device, comprising:

receiving an authentication request transmitted by the biometric payment device based on a signature and device information, the signature being generated by the biometric payment device according to the private key and the device information;

verifying the signature according to the device information;

generating an authentication result of the biometric payment device according to a verification result; and returning the authentication result to the biometric payment device, to implement a biometric payment based on biometric data transmitted by the authenticated biometric payment device.

2. The method according to claim 1, wherein the dynamic link library file is a shared object (SO) library file.

3. The method according to claim 2, wherein the code of the SO library file is obfuscated and reinforced at the payment authentication server before burning to the biometric payment device.

4. The method according to claim 1, wherein the verifying the signature according to the device information comprises: acquiring the corresponding public key, and verifying the signature according to the device information and the public key.

5. The method according to claim 1, wherein:

the generating of the public key corresponding to the biometric payment device is performed during a production phase and before a biometric payment device leaves a manufacturer factory; and the authenticating of the biometric payment device is performed during a merchant authentication phase and after the biometric payment device leaves the manufacturer factory.

6. A payment authentication server, comprising: a memory and a processor, the memory storing a computer program, and the processor, when executing the computer program, being configured to perform:

generating a public key corresponding to the biometric payment device, comprising:

receiving multi-factor device information of the biometric payment device uploaded by a manufacturer device;

generating a dynamic link library file storing a key of the biometric payment device according to the multi-factor device information;

obfuscating and reinforcing, at the payment authentication server, a code of the dynamic link library file, to obtain a reinforced dynamic link library file;

transmitting the reinforced dynamic link library file to the biometric payment device through the manufacturer device, the reinforced dynamic link library file being locally burned to the biometric payment device; and receiving, through the manufacturer device, a public key corresponding to the biometric payment device, wherein the public key is generated together with a private key by the biometric payment device based on the reinforced dynamic link library file; and authenticating the biometric payment device, comprising:

receiving an authentication request transmitted by the biometric payment device based on a signature and device information, the signature being generated by the biometric payment device according to the private key and the device information;

verifying the signature according to the device information;

generating an authentication result of the biometric payment device according to a verification result; and returning the authentication result to the biometric payment device, to implement a biometric payment based on biometric data transmitted by the authenticated biometric payment device.

7. The server according to claim 6, wherein the dynamic link library file is a shared object (SO) library file.

8. The server according to claim 7, wherein code of the SO library file is obfuscated and reinforced at the payment authentication server before burning to the biometric payment device.

9. The server according to claim 6, wherein the verifying the signature according to the device information comprises: acquiring the corresponding public key, and verifying the signature according to the device information and the public key.

10. A non-transitory computer-readable storage medium, storing a computer program, the computer program, when executed by a processor of a payment authentication server, causing the processor to perform:

generating a public key corresponding to the biometric payment device, comprising:

receiving multi-factor device information of the biometric payment device uploaded by a manufacturer device;

generating a dynamic link library file storing a key of the biometric payment device according to the multi-factor device information;

obfuscating and reinforcing, at the payment authentication server, a code of the dynamic link library file, to obtain a reinforced dynamic link library file;

transmitting the reinforced dynamic link library file to the biometric payment device through the manufacturer device, the reinforced dynamic link library file being locally burned to the biometric payment device; and receiving, through the manufacturer device, a public key corresponding to the biometric payment device, wherein the public key is generated together with a private key by the biometric payment device based on the reinforced dynamic link library file; and authenticating the biometric payment device, comprising:

receiving an authentication request transmitted by the biometric payment device based on a signature and device information, the signature being generated by the biometric payment device according to the private key and the device information;

verifying the signature according to the device information;

generating an authentication result of the biometric payment device according to a verification result; and returning the authentication result to the biometric payment device, to implement a biometric payment based on biometric data transmitted by the authenticated biometric payment device.

11. The storage medium according to claim 10, wherein the dynamic link library file is a shared object (SO) library file.

12. The storage medium according to claim 11, wherein the code of the SO library file is obfuscated and reinforced at the payment authentication server before burning to the biometric payment device.

13. The storage medium according to claim 10, wherein the verifying the signature according to the device information comprises: acquiring the corresponding public key, and verifying the signature according to the device information and the public key.

* * * * *